(12) United States Patent
Meulenbelt

(10) Patent No.: US 9,829,207 B2
(45) Date of Patent: Nov. 28, 2017

(54) COOLING DEVICE

(75) Inventor: Matthijs Dirk Meulenbelt, Borne (NL)

(73) Assignee: Lux et Libertas B.V., Borne (NL)

( * ) Notice: Subject to any disclaimer, the term of this patent is extended or adjusted under 35 U.S.C. 154(b) by 460 days.

(21) Appl. No.: 13/144,573

(22) PCT Filed: Jan. 18, 2010

(86) PCT No.: PCT/NL2010/050025
§ 371 (c)(1),
(2), (4) Date: Jul. 14, 2011

(87) PCT Pub. No.: WO2010/082828
PCT Pub. Date: Jul. 22, 2010

(65) Prior Publication Data
US 2011/0269388 A1  Nov. 3, 2011

(30) Foreign Application Priority Data
Jan. 18, 2009  (NL) .................................... 2002424

(51) Int. Cl.
*B64D 13/00* (2006.01)
*F24F 5/00* (2006.01)
*B60H 1/32* (2006.01)
*B60H 1/00* (2006.01)

(52) U.S. Cl.
CPC ......... *F24F 5/0035* (2013.01); *B60H 1/3202* (2013.01); *F24F 5/0089* (2013.01); *F24F 5/0092* (2013.01); *B60H 2001/00235* (2013.01)

(58) Field of Classification Search
CPC ....... F24F 2001/0092; F24F 2001/0088; F24F 5/0035; F24F 5/0089; F24F 5/02; F28D 5/02; F28D 5/00

USPC ........................................................... 454/76
See application file for complete search history.

(56) References Cited

U.S. PATENT DOCUMENTS

| 2,151,097 A | | 3/1939 | Germonprez |
| 2,213,421 A | * | 9/1940 | Wagner, Jr. ............... F28D 5/02 261/158 |
| 2,276,970 A | * | 3/1942 | Hibberd ................ F24F 3/1417 165/60 |

(Continued)

FOREIGN PATENT DOCUMENTS

| DE | 1012381 | 4/1952 |
| EP | 0432264 A1 | 6/1989 |

(Continued)

*Primary Examiner* — Alissa Tompkins
*Assistant Examiner* — Phillip E Decker
(74) *Attorney, Agent, or Firm* — The Webb Law Firm

(57) ABSTRACT

A device for realizing a cooling effect in a space comprises: a housing with a heat-conducting wall, which housing bounds a chamber through which air can flow; an air inlet which connects to the chamber and to said place, —an air outlet connecting to the chamber; air transport means for transporting air from the air inlet via the chamber to the air outlet; and moistening means for moistening the inner surface of the wall; this such that air supplied by the air transport means is introduced into the chamber via the air inlet, passes along the moistened inner surface of the wall in the chamber and is discharged from the chamber via the air outlet, whereby the water present on the inner surface of the heat-conducting wall evaporates and is entrained by the air flowing by, and the wall is cooled.

20 Claims, 12 Drawing Sheets

(56) References Cited

U.S. PATENT DOCUMENTS

| | | | |
|---|---|---|---|
| 2,552,819 A | 5/1951 | Schwarzmayr | |
| 2,766,397 A | 10/1956 | Nienhuis | |
| 3,524,398 A * | 8/1970 | Winfrey | F24F 3/1603 454/157 |
| 3,606,982 A * | 9/1971 | Anderson | B60H 1/3202 454/135 |
| 3,738,621 A * | 6/1973 | Anderson | 261/29 |
| 3,964,268 A * | 6/1976 | DiPeri | 62/121 |
| 4,094,935 A * | 6/1978 | Walker et al. | 261/80 |
| 4,261,930 A * | 4/1981 | Walker | 261/92 |
| 4,360,368 A * | 11/1982 | Lyon | 96/364 |
| 4,953,831 A * | 9/1990 | Albrecht | B60H 1/3202 454/131 |
| 4,970,876 A * | 11/1990 | Vinokurov | B60H 1/3202 454/328 |
| 5,074,116 A | 12/1991 | Kadotani et al. | |
| 5,112,535 A * | 5/1992 | Roberson | 261/27 |
| 5,168,722 A * | 12/1992 | Brock | 62/304 |
| 5,187,946 A * | 2/1993 | Rotenberg et al. | 62/314 |
| 5,301,518 A * | 4/1994 | Morozov | F24F 5/0007 261/153 |
| 5,361,600 A * | 11/1994 | Kelley | B01D 50/006 62/259.4 |
| 5,453,223 A * | 9/1995 | Maisotsenko | 261/153 |
| 5,529,536 A * | 6/1996 | Sizemore et al. | 454/157 |
| 6,327,994 B1 * | 12/2001 | Labrador | B01D 61/10 114/382 |
| 6,341,499 B1 * | 1/2002 | Polychronopoylos | F24F 5/0035 62/304 |
| 6,408,633 B1 * | 6/2002 | Carr | B60H 1/3202 165/104.11 |
| 6,497,107 B2 * | 12/2002 | Maisotsenko et al. | 62/121 |
| 6,511,049 B2 * | 1/2003 | Colussi et al. | 261/36.1 |
| 6,546,744 B1 * | 4/2003 | Cavender | 62/244 |
| 6,581,402 B2 * | 6/2003 | Maisotsenko et al. | 62/315 |
| 6,595,499 B2 * | 7/2003 | Colussi et al. | 261/30 |
| 6,669,556 B2 * | 12/2003 | Gautney | 454/338 |
| 6,705,096 B2 * | 3/2004 | Maisotsenko et al. | 62/121 |
| 6,776,001 B2 * | 8/2004 | Maisotsenko et al. | 62/315 |
| 6,796,136 B1 * | 9/2004 | Sullivan et al. | 62/171 |
| 6,863,119 B2 * | 3/2005 | Sugito | F28D 15/0266 165/104.33 |
| 6,895,772 B2 * | 5/2005 | Johnson et al. | 62/314 |
| 6,915,654 B2 * | 7/2005 | Johnson | 62/259.4 |
| 6,945,868 B2 * | 9/2005 | Gautney | 454/338 |
| 7,228,699 B2 * | 6/2007 | Gillan et al. | 62/314 |
| 7,234,309 B2 * | 6/2007 | Lee et al. | 62/95 |
| 7,395,676 B2 * | 7/2008 | White | F24F 5/0035 261/116 |
| 7,654,307 B2 * | 2/2010 | Bhatti | F24F 5/0035 261/156 |
| 8,468,846 B2 * | 6/2013 | Vaidyanathan | 62/304 |
| 2002/0078704 A1 * | 6/2002 | Stich | 62/310 |
| 2006/0032258 A1 * | 2/2006 | Pruitt | F24F 5/001 62/310 |
| 2007/0089448 A1 * | 4/2007 | Critchfield | 62/304 |
| 2007/0163772 A1 * | 7/2007 | Bhatti | F24F 5/0035 165/202 |
| 2007/0245747 A1 * | 10/2007 | Fukaya | F25B 9/14 62/6 |
| 2008/0028775 A1 * | 2/2008 | Ausseil | F24F 5/0035 62/91 |
| 2008/0041083 A1 * | 2/2008 | Al-Garni | F24F 5/0035 62/235.1 |
| 2009/0075581 A1 * | 3/2009 | Van Heeswijk et al. | 454/239 |
| 2009/0107158 A1 * | 4/2009 | Youn et al. | 62/239 |
| 2009/0241572 A1 * | 10/2009 | Nicolai | F24F 5/0035 62/231 |
| 2010/0018234 A1 * | 1/2010 | Gillan et al. | 62/259.4 |
| 2013/0314874 A1 * | 11/2013 | Kim | H05K 7/20272 361/698 |
| 2015/0343881 A1 * | 12/2015 | Farrington | B60H 1/3233 62/121 |
| 2017/0043647 A1 * | 2/2017 | Vergamini | B60H 1/3202 |

FOREIGN PATENT DOCUMENTS

| | | | |
|---|---|---|---|
| FR | 935697 A | 6/1948 | |
| FR | 938013 | 9/1948 | |
| GB | 464415 | 4/1937 | |
| JP | 57179553 A | 4/1981 | |
| NL | 56913 C | 8/1994 | |
| WO | 9000240 A1 | 1/1990 | |
| WO | 0129492 A1 | 4/2001 | |
| WO | WO-01/29492 A1 * | 4/2001 | ............ F25B 19/00 |
| WO | WO0129492 A2 * | 4/2001 | ............ F24D 7/00 |
| WO | 2005040693 A2 | 5/2005 | |

* cited by examiner

COOLING DEVICE

BACKGROUND OF THE INVENTION

1) Field of the Invention

The invention relates to a device for realizing a cooling effect in a space, for instance an accommodation area, an office space, a living room or a cab in a means of transport such as a car, a boat or an aircraft.

2) Description of the Related Art

Such a device is known in many embodiments.

Cooling devices for cooling the air in a space are characterized by a substantial air displacement. Particularly the sensation of being exposed to a cold airflow is often perceived as unpleasant.

The operating principle of existing cooling devices is however based on air displacement, so that the problem of exposure to a cold airflow and the corresponding sense of lack of comfort are inherent in the solution. Most used air-conditioning systems have in addition a number of generally known drawbacks: they are heavy, they consume a great deal of energy, they make use of environmentally impacting substances and often spread environmentally impacting substances. In addition, the most usual cooling devices can be adjusted to a very great difference between the indoor temperature in the relevant space and the outdoor temperature, which can cause disorders such as colds and headache. It is generally better advised to keep to a difference of a maximum 4 to 5° C. between the indoor air and the outdoor air. Air which is possibly too dry can further cause disorders such as headache, a dry throat, coughing or irritated eyes, and contaminated filters can also cause physical disorders through lack of sufficient maintenance.

SUMMARY OF THE INVENTION

It is a first object of the invention to provide a cooling device which is highly energy-efficient, does not comprise or emit any environmentally-impacting, let alone harmful substances, has a low weight, can be installed very simply and does not causes any cold and uncomfortable airflows.

A further object of the invention is to embody a cooling device such that it is suitable for application in fixed stationary spaces, for instance in a building, as well as in moving spaces, for instance in means of transport.

Different cooling methods are known which stand out in their environmental friendliness and high energy efficiency. An important option in this respect is the evaporation cooler which in some conditions can even be embodied as dew-point cooler.

The principle of the evaporation cooler is also used by the physical mechanisms of the human body. At a high ambient temperature perspiration occurs which can be evaporated by passing air, thereby causing a considerable decrease in temperature locally and so extracting heat from the skin. This effect occurs more noticeably in the case of more actively evaporating liquids such as methanol, ethanol or the like. If this liquid is applied to the skin, the relevant location feels cold because a great deal of heat is extracted from the skin as a result of evaporation of the liquid.

The same principle is used in the so-called water bag or a somewhat porous stone pitcher. The water bag or the pitcher, the wall of which is slightly moisture-permeable, is suspended in the wind. The water seeping through evaporates on the outside and thus extracts heat from the water in the bag. Particularly in desert regions this is a tried and tested method of keeping water cool. This principle has been applied since time immemorial.

More recent and modern applications can be found in air-conditioning installations for buildings and for instance campers, these systems making use of evaporation of water and the associated heat extraction. Water is here evaporated on the one side of a heat exchanger under the influence of a first airflow, and on the other side a second airflow is cooled on the heat exchanger and subsequently distributed via a conduit system for instance through the cab of the camper, or even a building. The second airflow can for instance be a partial flow of said first or primary airflow. The drawback of the clearly perceptible, substantial cold airflow hereby remains fully in evidence. It must however be acknowledged that there are no harmful substances in the case of such an evaporation cooler, and the device can operate at a very low energy consumption, i.e. no more than the energy necessary to generate and maintain the airflow.

There are also many cooling devices which do not make use of a substantial secondary airflow. The best-known example is the generally known refrigerator found in almost every Western household. Situated usually at the rear of the refrigerator is a heat exchanger which generates heat to the ambient air. By using a two-phase coolant and a compressor this heat is extracted from a cooling wall on the inside of the refrigerator. Such devices also exist on larger scale, for instance cooling installations with cooling plates in trucks intended for the purpose of refrigerated transport of perishable cargo. While these devices do operate without forced secondary airflow, they make use of a coolant, usually a freon, and are thermally not very efficient, or use a large amount of energy.

It is known that cooling by means of radiation absorption is perceived by people as being very pleasant. There are many examples of radiation-absorbing coolers, such as for instance buildings provided with concrete core activation, wherein conduits received in the floor and the floor above, i.e. the ceiling, are supplied with cold or hot water in order to provide for respectively absorption or emission of radiation, and also cooling ceilings, metal ceiling plates provided with meandering water conduits through which cold water is also carried for cooling purposes. A great advantage of this cooling method is that—in contrast to more conventional methods of cooling by means of cold airflows—they are not very sensitive to the necessary ventilation and the resulting disappearance of the cooling to the outside.

In order to obtain a comfortable effect from these radiation absorbers the difference between radiation temperature and space temperature must remain within limits. According to Fanger models and general professional practice, a difference of 5° is a guideline for the limit of comfort. This means that the cooling capacity in respect of convection or actual air-cooling capacity of these solutions is quite limited: the difference in generated radiation between a plate of 1 m² of 27° C. and one of 24.5° C. is $q=\sigma(T_2^4-T_1^4)$, in which T is the temperature in Kelvin and $\sigma$ the Stefan-Boltzmann constant is only 15 W. The effective cooling capacity in terms of convection is hereby negligible.

In so-called cooling ceilings a value is generally employed of about 60-70 W per m². This value is however difficult to realize in buildings in summary conditions because the temperature of a ceiling plate for the purpose of obtaining such a cooling capacity will be lower than the dewpoint in the prevailing conditions, with the result of condensation on the user side of the ceiling plate. This may then result in falling droplets, something which is a highly undesirable in many circumstances.

In the above described methods there is cooling from outside: a cold-generating agent (usually water) is supplied from outside and also discharged again to the outside and there recooled or at least made suitable for use for the cooling of the radiation absorber.

An alternative hereto are electrical cooling elements such as Peltier elements. Very interesting embodiments of a radiation absorber provided with Peltier elements are disclosed in EP-A-432 264 and WO-A-90/00240, wherein a radiation-absorbing wall in very close vicinity to the human user is proposed provided with electrical cooling elements which generate the absorbed heat on the inside of the hollow wall, where this heat is discharged upward by natural convection or mechanical ventilation. A small intermediate ceiling prevents the user of the space between preferably two of these walls, perhaps for the purpose of the radiation symmetry, once again being confronted with the discharged heat.

Electrical coolers do not of course have an efficiency of 100%, which means that on balance the space temperature will rise as a result of this solution, certainly when the efficiency of a fan must also be included in the calculation. While there is in the first instance a cooling effect discernible to the user, the air temperature does eventually increase.

Other systems are also known in which the cooling element is not placed in the upper part of the space but is disposed freely in the space for cooling, for instance as according to DE-A-1 012 381.

While it is not explicitly stated here what the source of the cooling itself is, the flow of air makes it fairly clear that what is involved is cold "from outside". For proper operation there is even a heat exchanger, which makes it wholly clear that heat (or cold) from outside is involved.

It would perhaps be advantageous to place such a device close to the user, but no mention is made of this in the specification.

A drawback to the solution is that also at locations (the side directed toward the ceiling) of the proposed relatively high solution, a large part of the radiation absorption will be provided at a relatively unfavourable location: the ceiling of the space, whereby no advantage is provided for the view angle of cold for the user present under the proposed cooler disposed lower in the space. This second wall, directed toward the ceiling, therefore has no effect for a possible direct user of the cooling.

As already stated above, other cooling methods have long been known for obviating the problem of the discharge of energy. The oldest is perhaps the human skin: causing transpiration moisture to evaporate from the skin results in direct cooling of the skin surface, a not insignificant means of cooling the human body. This is applied in particularly interesting manner in GB-A-1 937 041 and GB-A-464 415, wherein a cooling of a cargo of a truck is proposed which is similar to the action of sweat on the skin. Provided there is no problem caused by the condensation already referred to above, this is an excellent solution: if a very large amount of water is evaporated in a very large airflow, considerable cooling capacity is then obtained. If this must be transferred by means of a relatively extensive but flat surface such as the ceiling of a loading space of a truck, this will then quickly result in limitations. If the air moves in the loading space only as a result of convection, condensation will then occur quickly. This need not be a limitation per se, but does become so in circumstances where people have to be cooled. They will perceive falling droplets as unacceptable. If a second airflow is also brought about in the loading space of the vehicle, the temperature will indeed then fall to some extent, but probably much too little to keep for instance slaughtered meat to temperature. This is therefore a very limited application. The temperature of the heat-exchanging ceiling plate will moreover not fall below the dewpoint temperature, although the capacity will be considerable at very high air speeds in the cooling part. The comfort principle is then still applicable: much more than the guideline of 5° C. temperature difference between ambient temperature and radiation temperature will usually be perceived by people as unpleasant.

It could be contended that these methods stand up well for the cooling of people: when applied in a bus as according to U.S. Pat. No. 2,552,819, the system could be set very low so as not to cool the space but to cool only the passengers by absorbing their radiation. Air from outside is still used however, and condensation will still occur easily on the inside, for instance because the air humidity in the bus increases rapidly due to moist clothing and/or the transpiration moisture of the passengers.

The invention has for its object to improve in an extremely energy-efficient manner the sensation of comfort of a person by means of a combination of evaporation cooling and radiation absorption.

The device according to the invention comprises for this purpose a housing with a heat-conducting wall, which housing bounds a chamber through which air can flow;

an air inlet which connects to the chamber and to said space;

an air outlet connecting to the chamber;

air transport means, for instance fan means, for transporting air from the air inlet via the chamber to the air outlet; and moistening means for moistening the inner surface of said wall with an evaporable liquid, for instance water;

this such that air transported by the air transport means is introduced into the chamber via the air inlet, passes along the moistened inner surface of said wall in the chamber and is discharged from the chamber via the air outlet, whereby water present on the heat-conductive inner surface evaporates and is entrained by the air flowing by, and said wall is cooled.

We will first sketch an outline:

Taken as mathematical model is a fine summer day in the Netherlands:

The temperature amounts to 27° C., a good average value, as is that of the air humidity at about 78%.

With evaporation cooling the lowest achievable temperature of the air is 24.5° C. In terms of humidity the air is at that moment saturated: water no longer evaporates from the cooling element. In the most favourable conditions the temperature of the air in the space will not of course become lower than the maximum (minimum) achievable temperature. Much too little effect to cool cargo. This calculation shows that the method is wholly unsuitable for so-called process cooling.

The example of 24.5° C. as mentioned above is not therefore an arbitrary choice: on a fine summer day in the Netherlands no more can be achieved because of the dewpoint. This is comparable to water in a pan which is everywhere 100° C. when it boils and wherein the temperature rises only when the water has evaporated, unless the pressure is increased as in the case of a pressure cooker.

Suppose now however that an extensive surface is provided with a moisture-retaining a layer, this surface is arranged quite close to the user, a human or animal, in order to maximize the view angle:

It is then the case that:

If we assume that the human body dissipates on balance 70-100 W of energy via convection, conduction, evaporation via breathing and radiation; if we consider that a person loses 30-70% of his/her heat by means of radiation, wherein in warm conditions for instance half of 70-100% must be radiated via the skin, it can then be anticipated that the head, a relatively spherical shape, will have to lose much heat via radiation, bearing in mind that all radiation must leave the body via bare arms and head, assuming that the rest of the user is more or less clothed.

As mathematical model: a head, considered the ideal heat radiator with a diameter of ϕ20 cm, generates 58 W of heat at a skin temperature of 30° C. The head will of course also receive much radiation from the environment: walls, ceiling, trees and so on. Every body generates radiation, unless at the absolute zero point.

Continuing with the stated actual example of 27° C. and 78% relative air humidity.

If a double-walled evaporation cooler of 1 m² is arranged which is provided with a moisture-retaining layer with sufficient water on the inner side of the cooling side directed toward the user, it can then be calculated as already stated above in accordance with $q=\sigma(T_2^4-T_1^4)$ that the plate can absorb a radiation of 15 W. This is one quarter of the overall radiation emitted by a head. The head receives radiation from its overall environment as a result of the temperature of 27° C., so there is a strong sensation of comfort despite there not being a sensation of coolness since the difference in temperature between the radiant heat and the ambient temperature remains below 5° C. Nor is there a heat flow in respect of convection.

Suppose now that the evaporation cooler is embodied as a thin chamber, provided on the inner side of the side directed toward the user with a moistened, moisture-retaining side over which air drawn from the user space is carried at a speed which guarantees complete evaporation, it can then be calculated from the heat of evaporation of water (2258 kJ/1 or kJ/kg) that for 15 W or J/second cooling capacity only 24 grams of water per hour (3600 seconds) is necessary (15 J/s/2258000)/kg)×3600 seconds=0.0239 kg).

If—on the basis of the prevailing conditions of 27° C. and 78% relative air humidity—we now calculate that 24 grams of water are added to the air in one hour at the minimum ventilation of 20 m3 per hour per person, the air used for the evaporated water can then be added to the ambient air. This results in an increase in the relative air humidity of only about 2%, this not being significant.

The effect is in fact even more favourable: as a result of the evaporation of the water the temperature of the process air will hardly rise and, in favourable cases, even fall and the temperature of the space will thereby also fall again, this in contrast to for instance WO-A-90/00240.

In addition, a control for preventing condensation is no longer necessary: if the wall is kept no more than moist, it will then be understood that the wall never becomes colder than the prevailing dewpoint temperature. The action on the inner side then stops. Condensation therefore never occurs, because use is made of the air from the space, this in contrast to the other proposed solutions wherein use is made of air from a second space (the outside world) where the conditions may be wholly different. The system is hereby intrinsically free of condensation without any moisture sensor-related control needing to be applied.

If a choice is now also made for a very thin chamber, i.e. a chamber wherein the cold-absorbing side and the other side are very close together, for instance so-called channel plate, made for instance from polypropylene, and one side of the channels directed toward the extended side of the plate is provided on the inner side with an absorbent layer, the plate can thus just be filled with water occasionally or a droplet could be "blown" through each channel for the purpose of moistening the moisture-retaining layer. Air is then blown again through the channels which, as has been demonstrated above, can simply be added to the air in the user space. An outflow opening to the outside world is not necessary in the case of so little water vapour.

The cooler itself is then only a few millimeters thick.

This can of course also be achieved with for instance a metal plate having thereunder/thereabove a structure of channels having for instance a U-shape. This makes it possible to suffice with half the channels and places the inflow and outflow openings on the same side, which can be advantageous. The metal enhances the heat/cold conduction, although the outer walls of the channel plate are so thin that the insulating value of the plastic is not a major factor. A metal, for instance anodized aluminium plate, is aesthetically better and also more durable.

If this cooler, which is given a very thin form and is for instance provided on one side with a small supply tank of water and a very thin and therefore silent fan, is now suspended with the cooling wall facing downward, a ceiling island is now obtained which can also be provided with lighting. It is also very well possible to use the island as sound-damping panel.

When the cooler is placed above a table, the cooler also absorbs radiant heat from the tabletop, whereby the table becomes a more or less passive radiation cooler for the radiant heat emitted downward by the head. The effect is hereby enhanced to a significant extent because the view angle of the cooler suspended close-by relative to a regular cooled ceiling at greater distance is already sufficient and also has an added effect due to the absorption toward the tabletop. This advantage will of course also apply in the case of a usual cooled ceiling, since such a cooled ceiling also absorbs the radiant heat from a tabletop. The proposed cooler is however much more compact and only provides radiation absorption precisely where this is desired.

The thin version of the cooler can even be laid on the tabletop in similarly manner to a desk pad: the cooler then directly absorbs the downward generated radiant heat. With combined use of an upper and lower cooler this effect is of course much stronger. Side walls and a rear wall could optionally also be added, although the capacity then probably becomes too great and simplicity is lost.

The COP (the ratio of cooling capacity to power input) of an evaporation cooler based on water is very high because of the high heat of evaporation of water, roughly a factor of 10 higher than that of conventional cooling. The process air is not warmer, or hardly so, and in favourable conditions is even cooler than the inflowing air, and the process air can therefore be used as cooling air even though the capacity will be extremely low. Add to this that only radiant heat is taken into account, the energy consumption is then doubly advantageous: a high COP and a very low required cooling capacity as well as being wholly unsusceptible to airflow resulting from ventilation.

The invention provides an ideal cooler for modern houses which are very energy-efficient and where a home office becomes very warm. A pleasant workplace can be created using this cooler.

The cooler also provides a solution for instance in schools, where there is often no space for later inclusion of central air-conditioning; conventional compact air-conditioners have little effect here because of the high ventilation requirement.

The temperature of the system is controllable by modifying the strength of the airflow; very low air speeds result in a slower evaporation of the water, and thereby a smaller fall in temperature. The effect will of course be lost when water is no longer present in the moisture-retaining layer.

In a preferred embodiment the device has the special feature that the air outlet debouches outside the space for cooling. Such an embodiment prevents the moistened airflow, which entrains water vapour, increasing the relative humidity too substantially in the space for cooling, which can be perceived as unpleasant, although as already explained above the increase in the air humidity will be very limited in most conditions but can in determined conditions result in condensation.

According to yet another aspect of the invention, the device can have the feature that the wall is disposed at least more or less horizontally. Such an embodiment has the advantage that the device can adjust itself in substantially natural patterns to the lines and surfaces present in the space. The device can hereby become more or less optically inconspicuous in its surroundings, which may be preferred from an aesthetic viewpoint.

With a view to an efficient evaporation with the lowest possible flow rate of the throughflow air and in order to ensure that the device takes up the least possible space, the device can have the special feature that the housing is embodied as a hollow panel with a linear dimension transversely of the wall amounting to a maximum of 1/10, preferably 1/20 or, with the channel plate, perhaps even 1/30 to 1/50 of a representative linear dimension, for instance the length or the width of said wall.

This latter embodiment, particularly in combination with the above discussed aspect, can have the feature that the wall is disposed at least more or less horizontally, for instance is embodied as lowered ceiling panel. Practically and aesthetically this can be highly recommended.

It will be apparent that it is of the greatest importance that the air flowing by is able to evaporate water present on the inner surface of the wall with the highest possible efficiency in order to thus cool the wall. It is therefore recommended that the device is embodied such that said inner surface is embodied such that water disperses thereover without droplet formation.

In order to achieve this object the device can for instance have the feature that said inner surface is subjected beforehand to a corona treatment.

Alternatively, the device can be embodied such that said inner surface is provided with a hydrophilic cover layer.

In another embodiment the device can have the feature that said inner surface is provided with a porous cover layer, for instance of a cement such as Portland cement, or a fibrous mat. As fibre material for a mat it is possible to envisage for instance mineral fibres such as glass wool or rockwool. Synthetic fibres or natural fibres can also be applied.

In order to prevent the growth of fungi and algae and the accumulation of germs, an agent can for instance be added to the cover layer which combats these undesirable phenomena. The literature also suggests the possibility of providing the relevant surfaces with a cover layer of $TiO_2$. Such a cover layer must be irradiated continuously, or at least with some regularity, with ultraviolet (UV) radiation. The $TiO_2$ acts as a catalyst, and the combination with ultraviolet radiation provides for a very strong germicidal action.

The moistening means can be embodied in any suitable manner. Recommended is an embodiment in which the moistening means comprise a number of drippers or sprayers.

In order to make the effectiveness of the device greater than is possible with a single, for instance flat wall, a specific embodiment of the device can have the special feature that means enlarging the heat conducting surface area, for instance fins, are added at least to the inner side and at least to a part of the heat conducting wall, said surface area-enlarging means being in direct thermal contact with the wall.

The device according to this latter embodiment can have the feature that the surface area-enlarging means are added to the inner surface of the wall. The outer surface thereby remains unaffected, while the cooling efficiency of the device can nevertheless be considerably improved. This aspect will therefore have the effect that the average temperature of the wall will fall considerably, which will further increase the efficiency, or COP (coefficient of performance). It is noted here that an air-conditioning device in for instance a car has a COP (the ratio of the effective cooling capacity to, usually electric, power input) which will be no greater than 2-3. For usual air-conditioning installations in fixed arrangements, so in houses, offices, factories and the like, a COP in the order of 3-6 is realized with the better, more modern installations. The evaporation cooler according to the invention, to the extent this is necessary, makes use of only an electric fan and the high heat of evaporation of water, without any form of compression of a two-phase medium being necessary. The COP can hereby be spectacularly higher than in the case of known air-conditioning, for instance 10-20, or even higher.

It must also be remembered here that the cooling device according to the invention operates substantially completely silently.

In a specific optional embodiment the device has the feature that the moistening means are only active in the upstream zone of the wall such that the air cooled in this zone cools the remaining downstream zone of the wall. If the process air in this first zone were to be wholly saturated with water, there is then still no danger of condensation in the downstream zone of the wall because this second zone will be warmer than the first and the solubility of water vapour in air increases as the temperature of the air rises.

BRIEF DESCRIPTION OF THE DRAWINGS

The invention will now be elucidated with reference to the accompanying drawings of two random exemplary embodiments.

In the drawings.

DETAILED DESCRIPTION OF THE PREFERRED EMBODIMENTS

Figure 1:
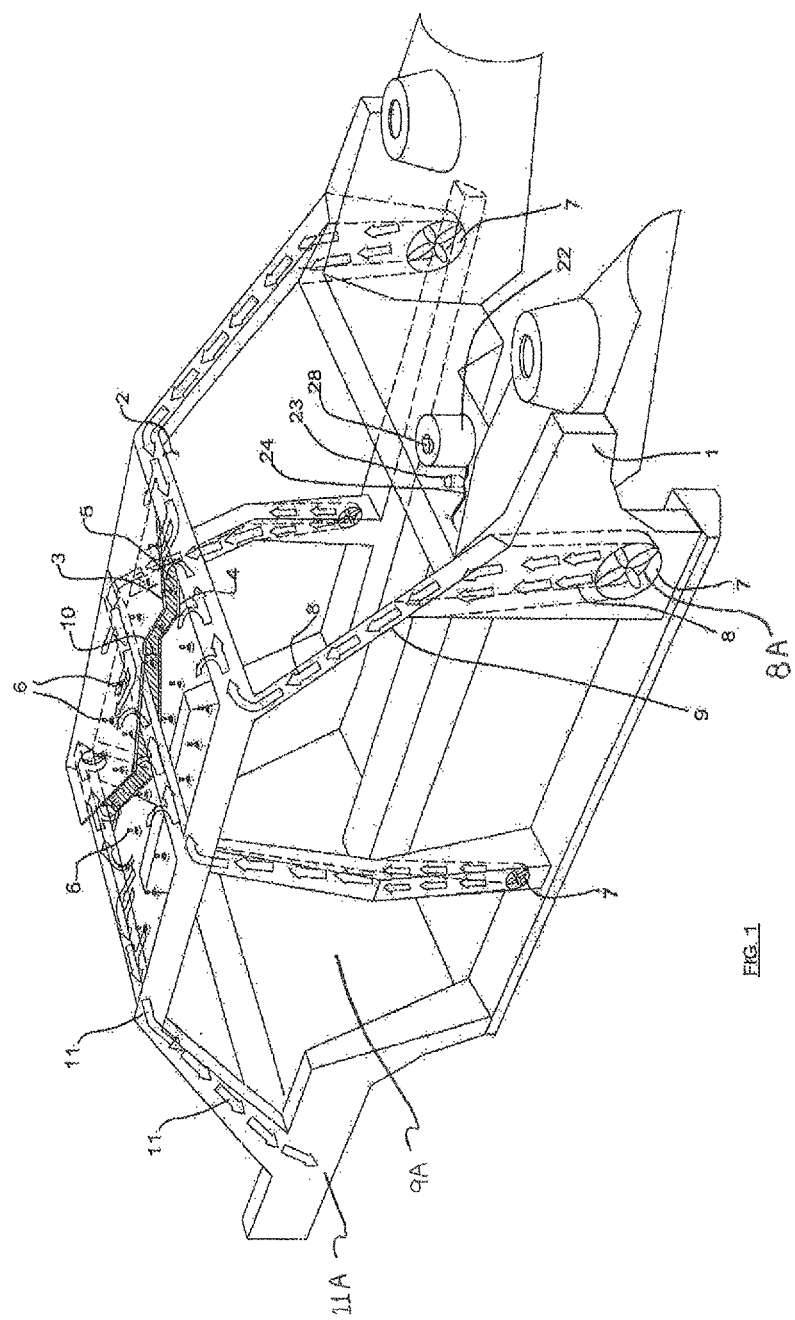
FIG. 1 shows a partially cut-away perspective view of the bodywork of a car provided with a cooling device with electric fans.

FIG. 1 shows the body 1 of a car with a cooling device 2 according to the invention. The cooling device is embodied as a shallow panel with an inner space 10 and is bounded on the top side by car roof 3 and on the underside by a horizontal wall 4 which, compared to usual cars, takes the place of the so-called roof lining. The inner surface of lower wall 4 is provided with a liquid-retaining layer 5, consisting for instance of Portland cement or a thin layer of fibre material. The layer thicknesses can for instance be in the order of 0.1-0.3 mm. A suitable, easily evaporating liquid, for instance water, is fed to layer 5 by an arrangement of sprayers 6 which provide for a uniform moistening of layer 5. The sprayers receive water via a conduit system (not shown) connected to a conduit 24 and a supply tank 22 with a filler cap 28. Water can be fed under pressure intermittently, in accordance with requirement, to sprayers 6 by means of a simple pump 23, for instance a pump of the type used to deliver windscreen washer fluid.

Arranged at a suitable location are fans 7 which blow air, indicated with arrows 8, drawn only from the space 9A inside the cab of the car through air inlet 8A and through the hollow jambs 9 into chamber 10 such that the inblown air 8 flows over the moistened layer 5 and leaves device 2 at the rear through hollow jambs 9 as according to arrows 11, and may be discharged through the air outlet 11A back into the space 9A or to the surrounding environment. The air entering the chamber (10) is untreated air from the space (9A). As a result of a flow of non-saturated air flowing over the wet layer 5 the water present in this layer 5 evaporates, this having in a known manner a strong cooling effect. Wall 4 is hereby cooled. The wall 4 is facing the space 9A, such that the space 9A is subjected to radiation from the wall 4.

A wall is thus placed in the vicinity of the head of the users which has a lower temperature than the air toward which it is directed, thereby creating a net radiation absorbing effect, moreover in the vicinity of the head, relatively the greatest radiator and certainly the most sensitive in respect of perception of cold and heat. In the shown embodiment the process air is discharged to the outside. The reason for this is that the space in the cab of a car is so limited that the air humidity can increase quickly here due to the water evaporated because of the cooling, and this can be unpleasant.

Fans 7 are placed as overpressure fans, therefore on the upstream side of device 2. Alternatively, fans 7 could also be placed as underpressure or suction fans, and could therefore be disposed on the downstream side of device 2.

Figure 2:
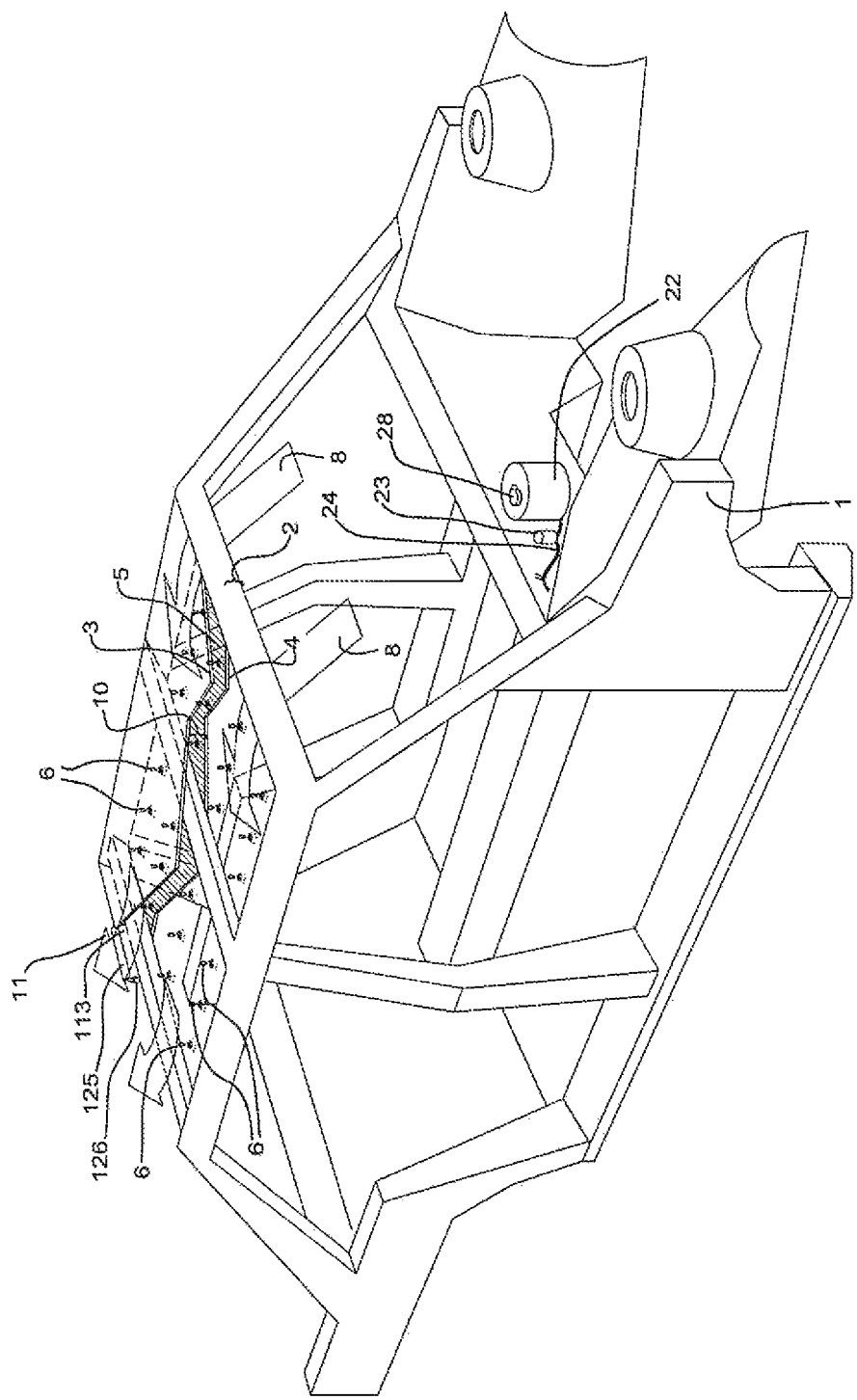
FIG. 2 shows a view corresponding to FIG. 1 of an embodiment which operates without electric fans but is based solely on an airflow which occurs during driving of the car.

FIG. 2 shows a variant in which the intake airflow 8 is not generated by fan means as in FIG. 1, but via favourably placed outflow openings to the outside world 125 and 126 placed at a location in the outer side of the car where underpressure or a very high air speed prevails during driving, whereby the outflowing air 11 is suctioned away and airflow 8 is thereby drawn into chamber 10. Situated on the rear side of chamber 10 are outlet openings 113 which can be opened and closed by means of flaps 125 operated by actuators 126. The cooling device according to FIG. 2 will only function in the case of a substantial vehicle speed.

Figure 3:
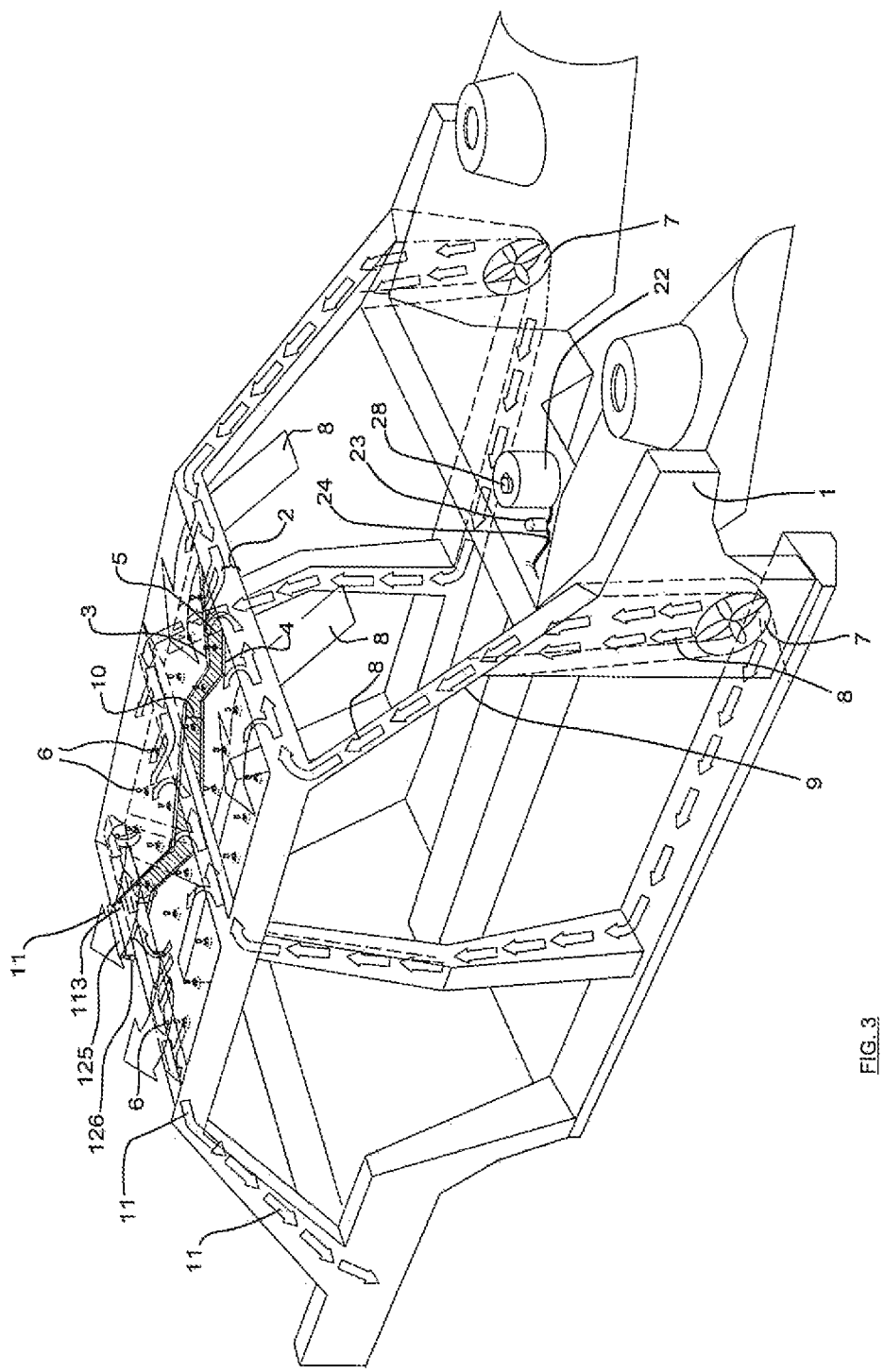
FIG. 3 shows a view corresponding to FIGS. 1 and 2 of an embodiment which can operate on the basis of electric fans as well as on passing wind.

FIG. 3 shows an embodiment wherein use is made of both fans 7 and outflow openings 113. The small fan in the middle jamb is omitted, while the airflow from the fan arranged on the front side of the vehicle nevertheless provides for airflow at that location. Fans 7 could otherwise be accommodated directly in lower wall 4.

Figure 4:
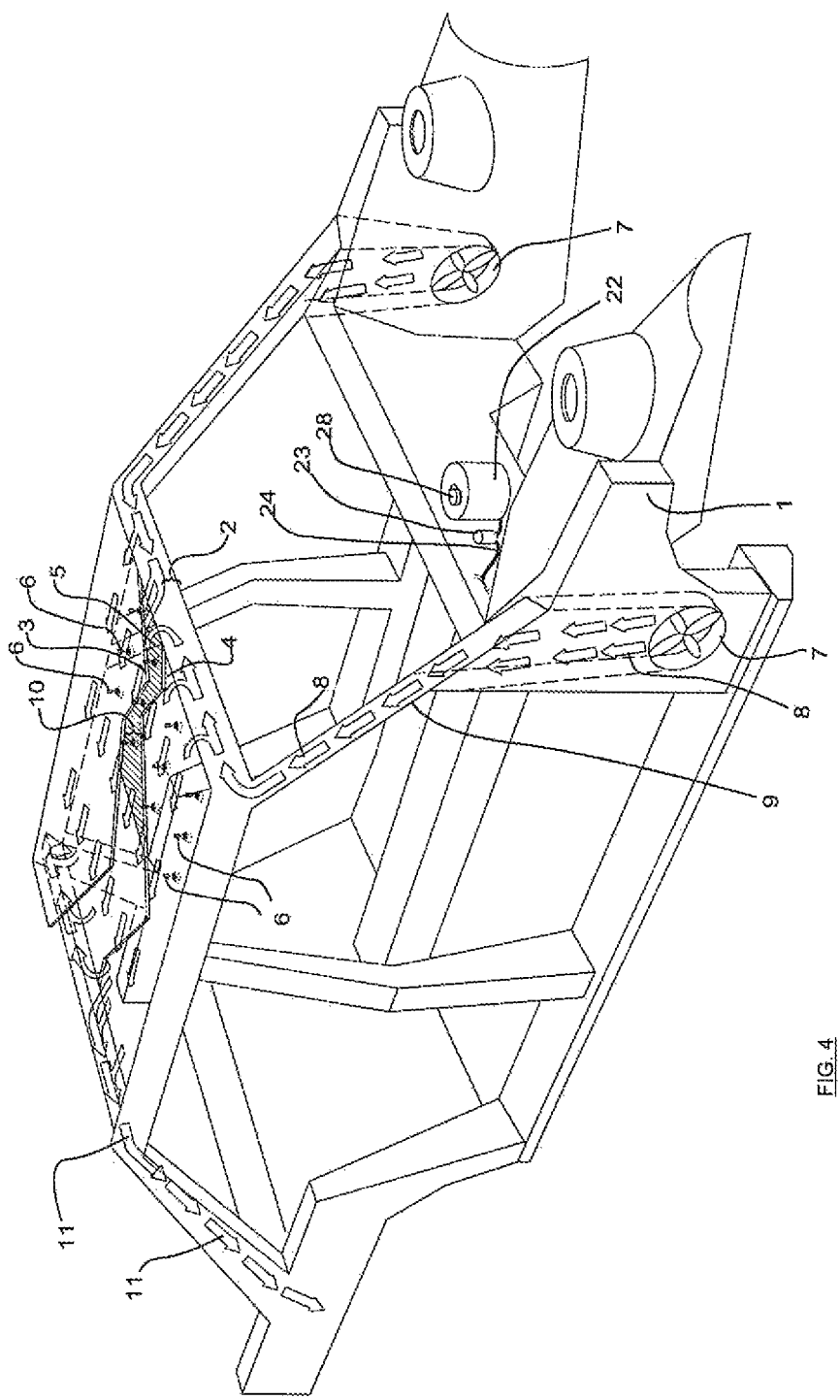
FIG. 4 shows a view corresponding to FIGS. 1, 2 and 3, wherein a liquid-retaining layer with the associated moistening means is present only on the upstream side of the lower wall.

FIG. 4 shows an embodiment wherein the heat-conducting lower wall is provided with a water-dispersing and/or water-retaining layer, for instance a thin layer of Portland cement, over about half its length in the flow direction of the air from the intake side. The sprayers 6 are placed only in this zone. In the embodiment according to FIGS. 1, 2 and 3 these are placed distributed in a regular arrangement over the whole surface. The second half of the lower wall, warmer than the first half, can then reheat the throughfed, moistened and, in ideal conditions, cooled air, whereby the temperature of the second half of the lower plate decreases while the solubility of water vapour increases due to the raised air temperature, thereby decreasing the danger of condensation in chamber 10.

Figure 5:
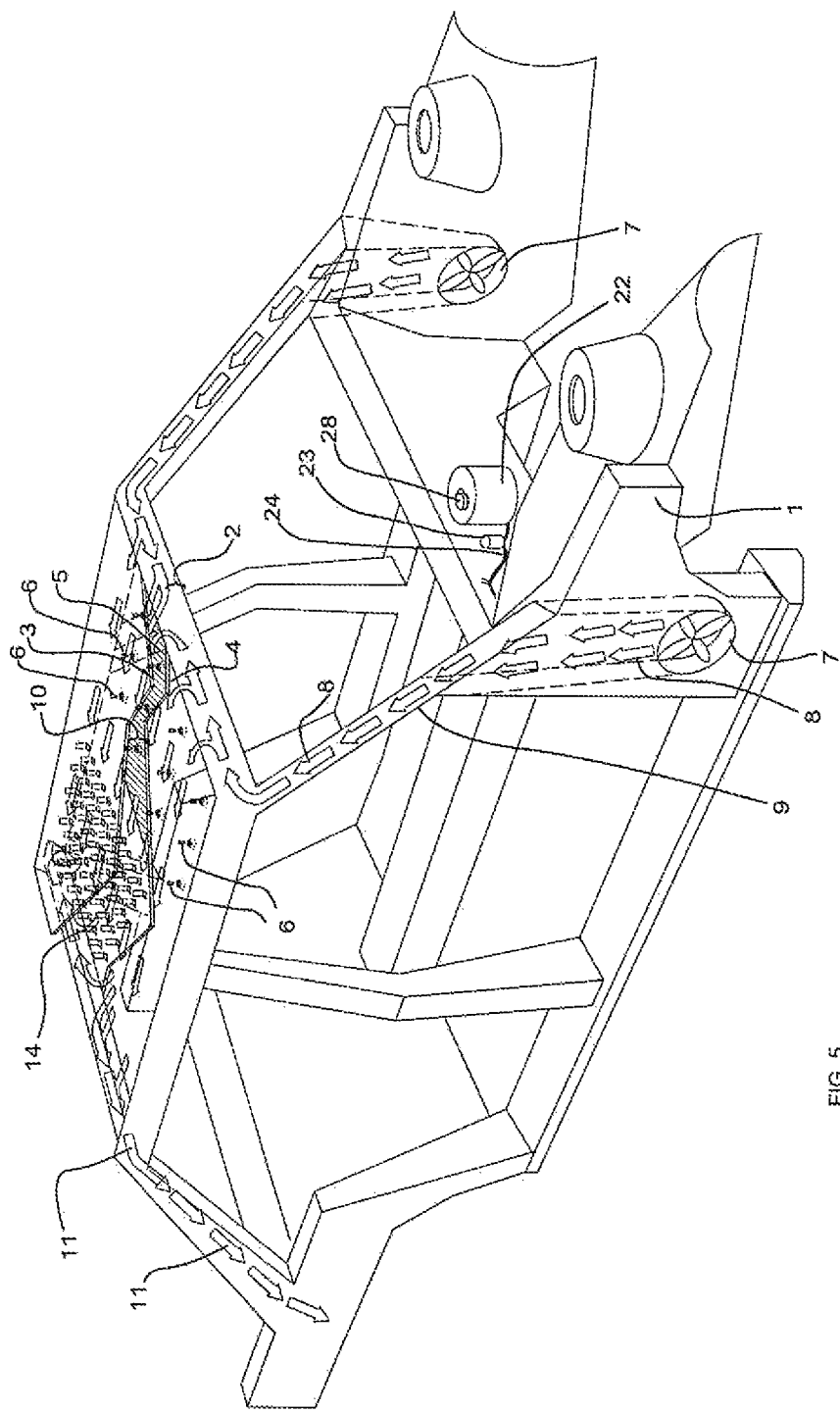
FIG. 5 shows a view corresponding to FIGS. 1-4 of an embodiment with a moisture-retaining layer with associated moistening means arranged only upstream, and provided downstream with surface area-enlarging means, in particular fins.

FIG. 5 shows a variant of the embodiment according to FIG. 4, wherein surface area-enlarging means 14 are arranged on the downstream side on the heat-conducting lower wall. Such fins can for instance be manufactured from a heat-conductive material such as copper or aluminium.

Figure 6:
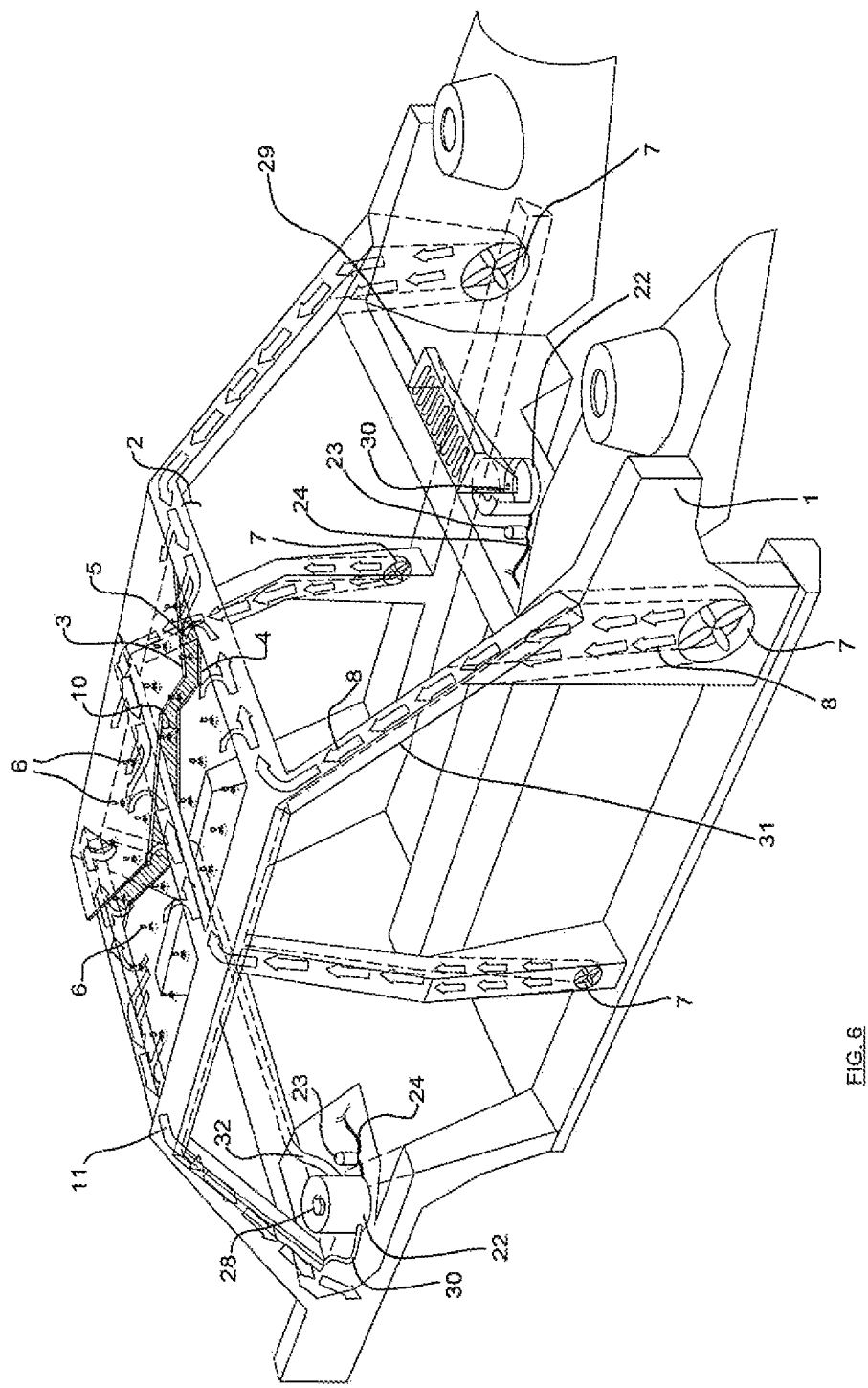
FIG. 6 shows a view corresponding to FIGS. 1-5 of an embodiment with provisions for the use of precipitation water.

FIG. 6 shows an embodiment wherein precipitation, in particular rainwater, is collected via a receptacle 29 which drains into a reservoir 22, which can moreover be provided with a filler cap, via a conduit 30 and via roof gutter 31 via a conduit 30 into for instance a second reservoir 22 which is also provided with a filler cap 28 with a pump 23 and a conduit 24 connecting to the conduit system (not shown) and sprayers 6, wherein connecting conduit 32 supplies the water from roof gutter 31 on the other side.

The device according to FIG. 3 in a car can thus operate without external energy supply, or optionally with very low energy consumption, i.e. the optional consumption of fan means 7. This creates additional possibilities: suppose that the car is parked in the sun and the roof were provided with photovoltaic panels. Such panels built into a roof of a car are for instance known from the German car manufacturer Audi. Audi supplies as option a sunroof which, with a sufficient irradiation by sunlight, powers an electric fan which ventilates the interior during parking, whereby the temperature in the interior increases less extremely than in the case of a non-ventilated cab. Such a known system does not in fact cool, it merely ventilates. If the electrical energy from the solar panel is now used in the configuration according to FIG. 1 in combination with device 2, a cooling effect is realized with a fraction of the energy required for sluice ventilation. Cooling takes place at the position where it has the most effect, i.e. on the top side where, after people have got in, their heads are situated, so that these people feel the comfortable effect of radiation absorption.

It is noted that it is deemed useful in this application to insulate the inner surface of roof 3 of chamber 10, for instance by means of a layer of expanded polystyrene foam. This prevents the cooling effect resulting from the operation of the cooling device being partially counteracted by too strong a heating under the influence of solar irradiation.

Figure 7:
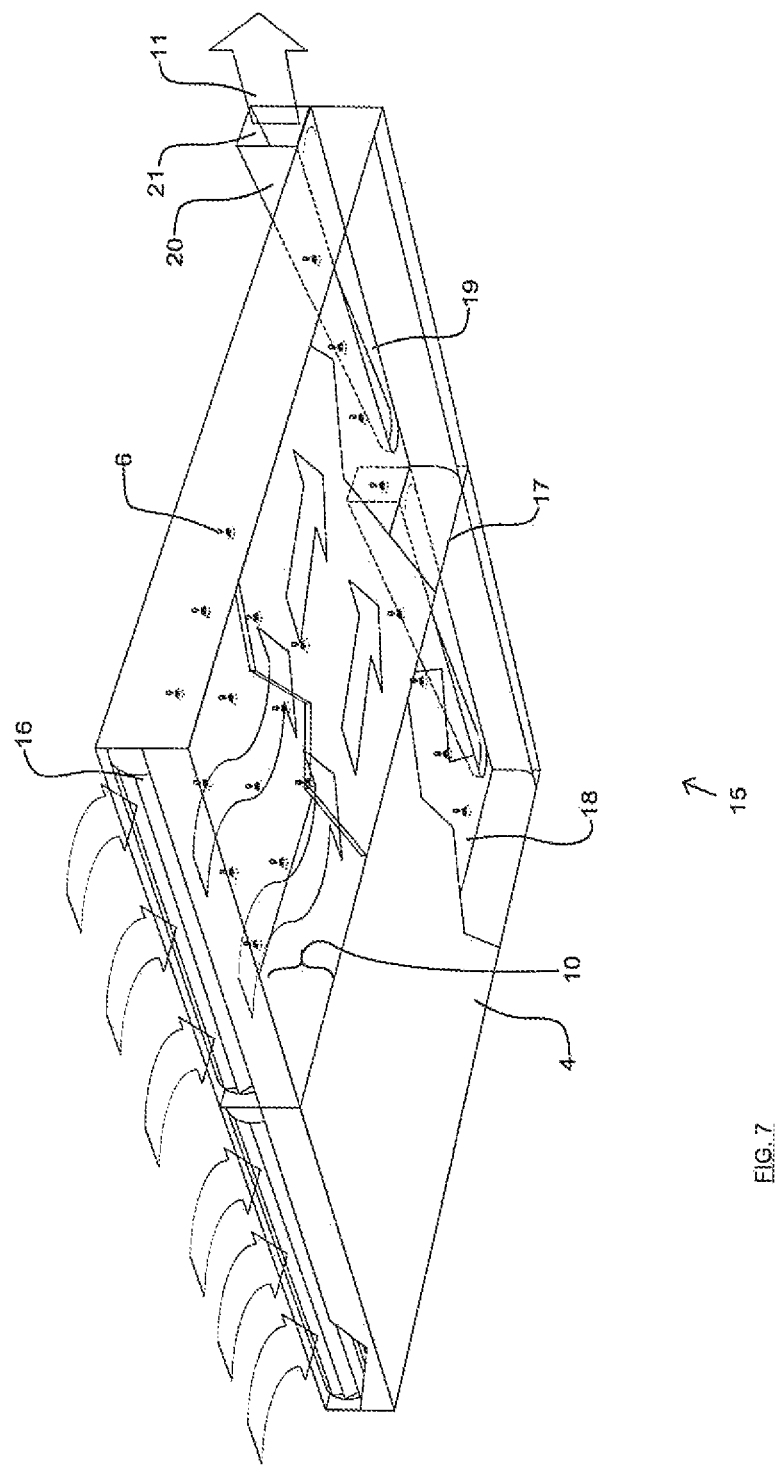
FIG. 7 is a partially cut-away perspective view from the underside of a device according to the invention in the form of a ceiling panel for use in a room or similar space.
Figure 8:
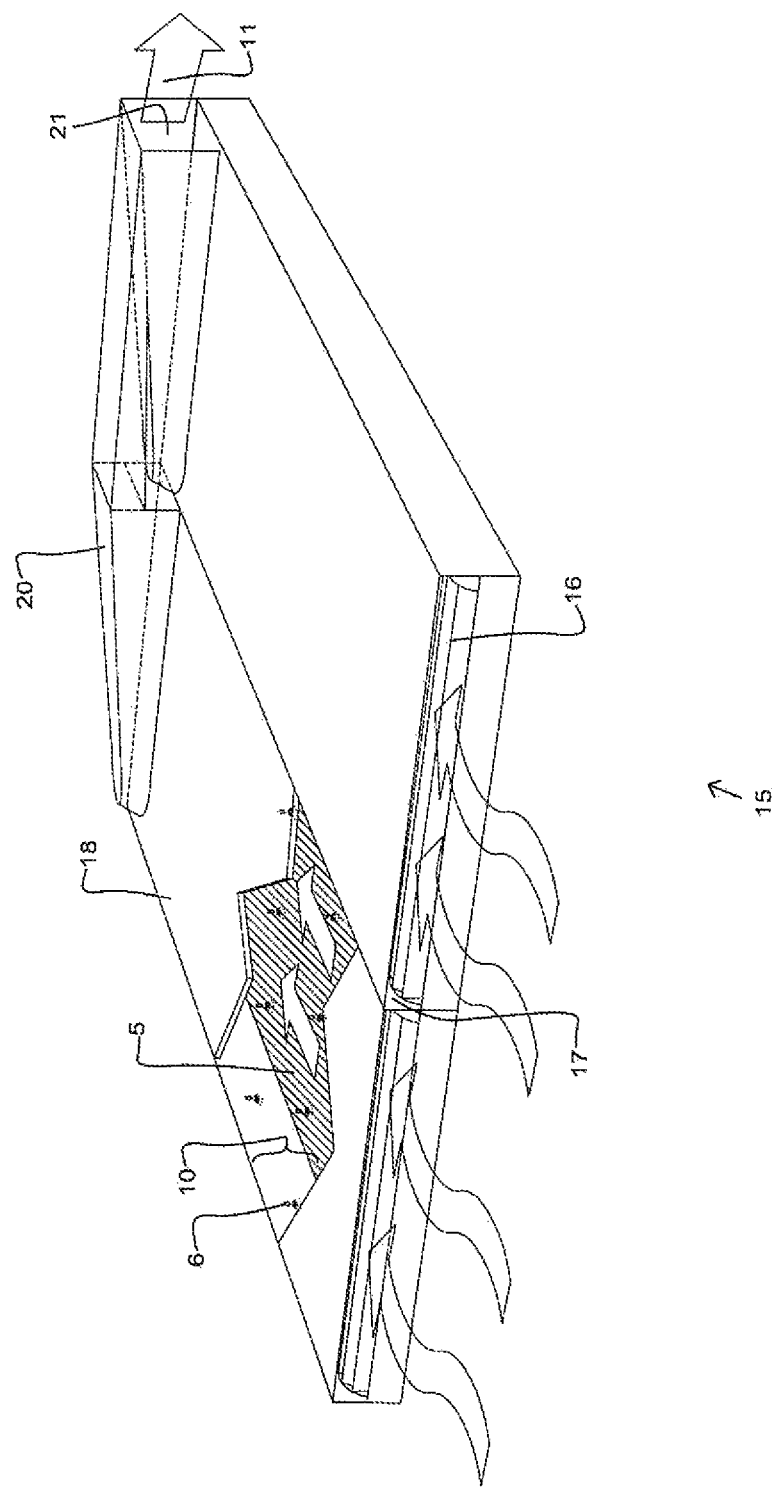
FIG. 8 is a partially cut-away perspective view from the top side of the device according to FIG. 7.

FIGS. 7 and 8 show a panel-like cooling device 15 according to the invention intended for instance for hanging on a ceiling of for recessed placing therein. Where applicable and useful, the same reference numerals are used in FIGS. 7 and 8 as in FIG. 1.

Instead of a fan placed at distance, device 15 comprises two tangential fans 16 which have a small diameter and have a length amounting to about half the width of device 15. For purposes of mechanical rigidity the device has two compartments separated from each other by a vertical dividing wall 17. In the context of the invention this principle is more generally applicable in respect of the use of modularity.

On the blow-out side the upper wall 18 has two outlet slits 19 which debouch into respective plenum compartments 20 which discharge the cooled moistened air 11 via an outlet opening 21, which debouches outside the user space for instance via a conduit. In an alternative embodiment (not shown) fans 16 could also be placed on the outlet side and air drawn in via plenum compartments 20.

In a further alternative embodiment (not shown) the plenum compartments could be omitted, since the air which is moistened by evaporation of water and which has flowed through chamber 10 will under normal conditions have little effect on the relative air humidity in buildings.

This device could also be connected to the ventilation device or venting of a building or an optionally present solar chimney, wherein the whole extraction can take place completely passively on the basis of a thermosiphoning effect.

Figure 9:
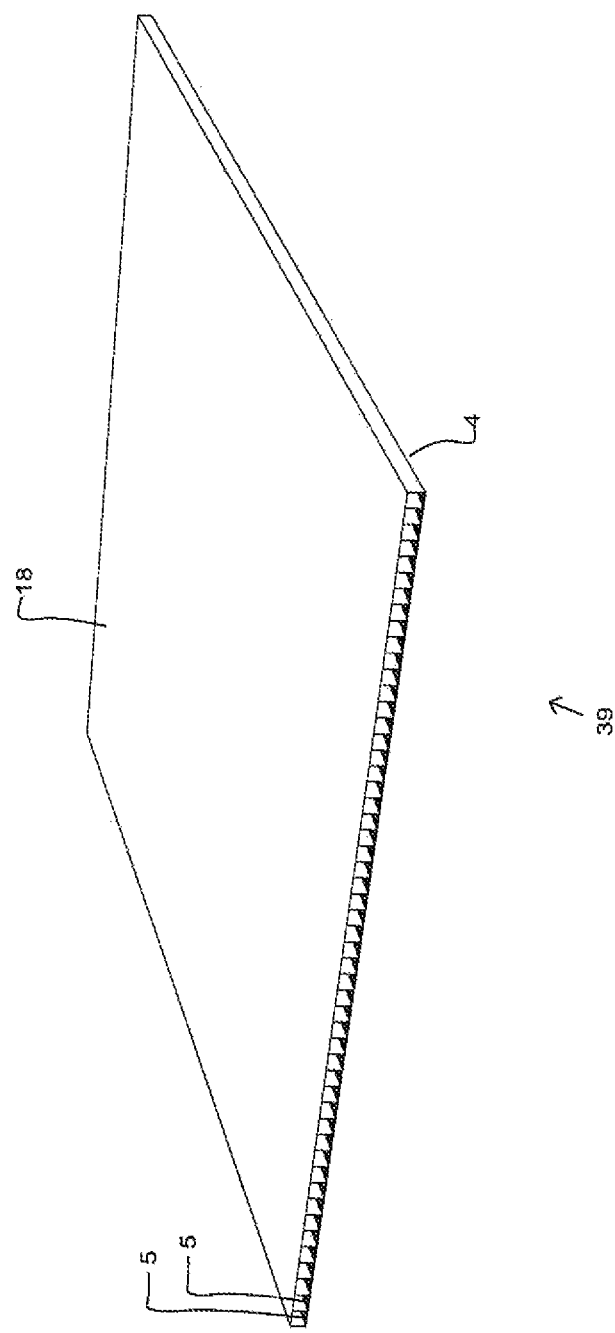
FIG. 9 shows a plastic channel plate greatly resembling for instance corrugated cardboard.

FIG. 9 shows a so-called channel plate 39, a panel constructed from two plates with mutually parallel ribs therebetween, which displays a great similarity to corrugated cardboard and could be used as housing for the cooler in a similar manner as the housing of the cooler according to FIG. 7 and FIG. 8.

Where applicable and useful, the same reference numerals are used in FIGS. 9, 10, 11 and 12 as in FIGS. 1-9.

The lower plate 4 in the figure is provided on the side directed toward the inner side of the panel with a moisture-retaining layer 5. The second plate of the channel plate forms the wall 18. The intermediate ribs can be compared to the dividing wall 17. Channel plates can for instance be obtained embodied in polymethyl methacrylate (PMMA), polycarbonate (PC) and polypropylene (PP). This latter embodiment is mainly very thin-walled. Usual embodiments weigh 300-500 gram per square meter at a panel thickness of 3-5 mm.

Figure 10:
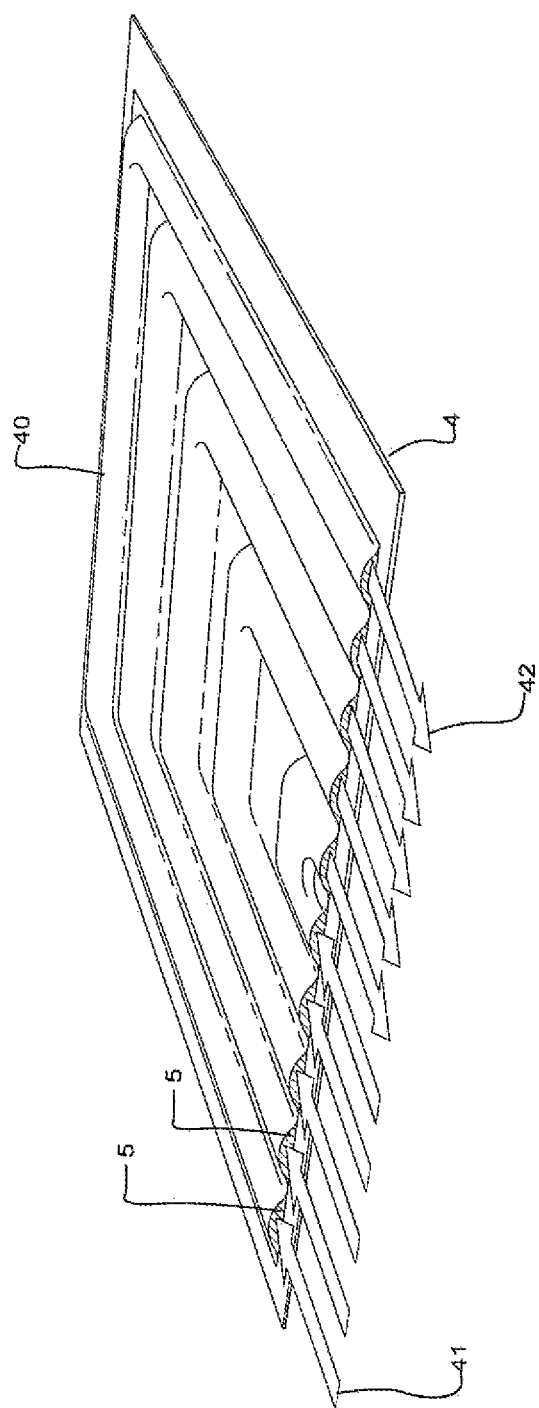
FIG. 10 shows a metal plate on which is arranged a plate with more or less U-shaped channels.

FIG. 10 shows a variant of the channel plate according to FIG. 9. Lower plate 4 is now for instance a metal plate on which a second metal plate 40 is arranged with more or less U-shaped channels. A moisture-retaining layer 5 is arranged in the channels on the side of extended surface 4 directed toward second plate 40.

The moisture-retaining layer 5 is moistened by first carrying the cooling medium, for instance water, as according to arrows 41 through the U-shaped channels and discharging it as according to arrows 42. Air from the user space is then carried through the U-shaped channels as according to arrows 41 and discharged as according to arrows 42.

Figure 11:
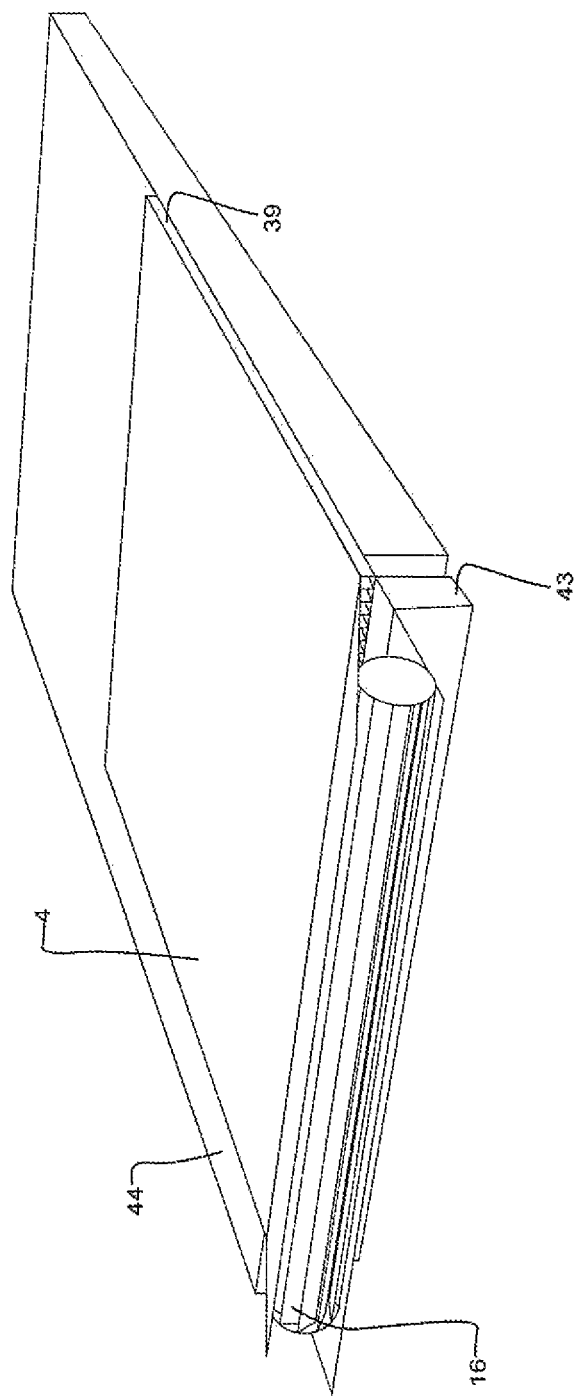
FIG. 11 shows a cooler according to the invention which is laid on a tabletop and provided with a water reservoir and fan.

FIG. 11 shows a cooler similar to that of FIGS. 8 and 9 which is laid on a tabletop 44.

In contrast to the ceiling plate of FIGS. 8 and 9, plate 4 now faces upward. Coolant, for instance water, is fed intermittently from water reservoir 43 to the channels of channel plate 39 as according to FIG. 9 in order to moisten the moisture-retaining layer 5 (not shown). The tangential fan 16 carries air through the channels of channel plate 39 so that plate 4 cools due to the extraction of heat of evaporation due to evaporation of the coolant.

Figure 12:
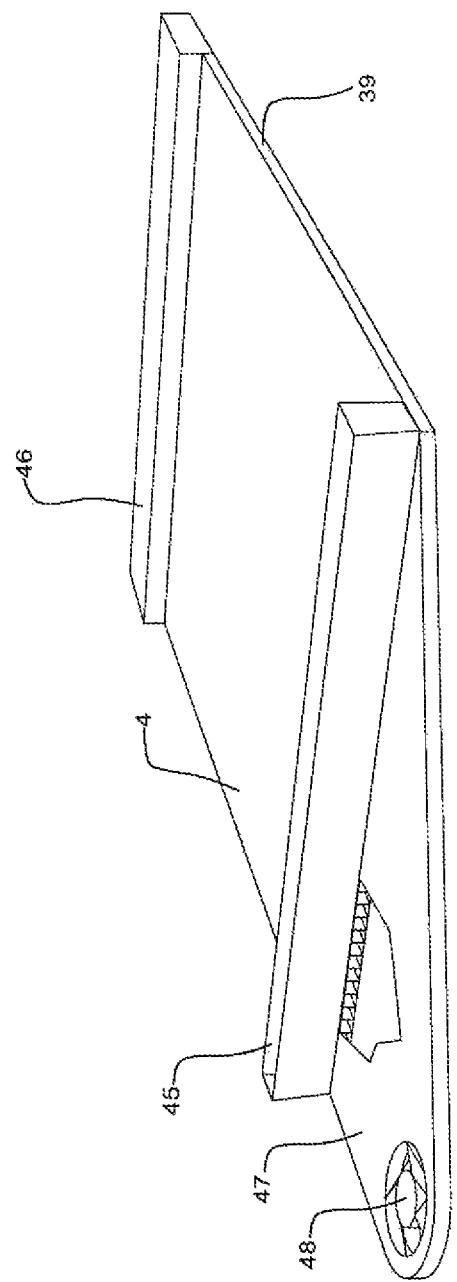
FIG. 12 is a partially cut-away view of cooler which can be used on a tabletop and is provided with a small axial fan and a droplet reservoir.

FIG. 12 shows a partly cut-away view of a cooler similar to that of FIG. 11, wherein an axial fan 48 blows air through channel plate 39 via a plenum compartment 47. Plate 4 once again faces upward here.

Coolant, for instance water, drips via suitably dimensioned holes out of reservoir 45 into the channels of channel plate 39 for the purpose of moistening the moisture-retaining layer 5 not shown in the drawing. Possible excess coolant is collected in reservoir 46. The coolant can be pumped back from reservoir 46 to reservoir 45 or flow back by means of capillary action to reservoir 45. It is also possible to envisage the excess coolant being poured back manually into reservoir 45.

This cooler could in this embodiment also be laid on a tabletop. A ceiling plate is once again created if channel plate 39 is rotated through 180° over the longitudinal axis of the channels.

For the drawn embodiment of FIGS. 1 to 6 for applying in for instance vehicles, FIGS. 7 and 8 as ceiling plate and 9 to 12 as cooler in very thin form as both ceiling cooler and for instance tabletop cooler, it is the case that a transparent cooler can be made by making use of for instance glass, PMMA and PC as material for the plates of the chamber which are important for operation and through which air is carried and on which according to 5 a moisture-retaining layer which is transparent, such as for instance a transparent, hygroscopic polymer, is arranged on the relevant sides.

Another means for reducing the surface tension of the coolant, for instance water, could also be used instead of a moisture-retaining layer 5. It is possible here to envisage a slowly self-sacrificing layer of a soap-like substance, a surface treatment such as a corona treatment or surface roughening.

These alternatives to the moisture-retaining layer can also be wholly transparent, certainly when they are moistened to some extent.

The coolant, for instance water, being visible could moreover have a placebo effect on the people in the user space.

The invention claimed is:
1. A device for realizing a cooling effect in a space, wherein the space may be an accommodation area, an office space, a living room or a cab in a means of transport, comprising:
   a housing with a heat-conducting wall, which housing bounds a chamber through which air can flow, wherein the heat-conducting wall is facing the space such that the space is cooled by radiation absorption;

an air inlet which connects the space to the chamber and through which only air from the space travels into the chamber, wherein the air entering the chamber is untreated air from the space;

an air outlet connecting to the chamber through which air exits from the chamber;

air transport means for transporting air from the space through the air inlet via the chamber to the air outlet; and moistening means for moistening an inner surface of said wall with an evaporable liquid;

such that all of the air from the space transported by the air transport means is introduced into the chamber via the air inlet, passes along the moistened inner surface of said wall in the chamber and is discharged from the chamber via the air outlet, whereby evaporable liquid present on the moistened inner surface evaporates and is entrained by the air flowing by, and said wall is cooled, but to a temperature never less than the dew point of the air in the space, the heat-conducting wall performing both functions of bounding the chamber and cooling the space by radiation absorption.

2. The device as claimed in claim 1, wherein the air outlet debouches outside the space for cooling.

3. The device as claimed in claim 1, wherein the wall is disposed horizontally.

4. The device as claimed in claim 1, wherein the housing is embodied as a hollow panel with a linear dimension transversely of the wall amounting to a maximum of 1/10 of a representative linear dimension.

5. The device as claimed in claim 4, wherein the linear dimension is selected from the group comprising a length and a width of said wall.

6. The device as claimed in claim 1, wherein said inner surface is embodied such that water disperses thereover without droplet formation.

7. The device as claimed in claim 6, wherein said inner surface is subjected beforehand to a corona treatment.

8. The device as claimed in claim 6, wherein said inner surface is provided with a hydrophilic cover layer.

9. The device as claimed in claim 6, wherein said inner surface is provided with a porous cover layer.

10. The device as claimed in claim 9, wherein the porous cover layer is selected from the group comprising cement and a fibrous mat.

11. The device as claimed in claim 1, wherein the moistening means comprise a number of drippers or sprayers.

12. The device as claimed in claim 1, wherein means enlarging the heat-conducting surface area are added at least to the inner side and at least to a part of the heat-conducting wall, said surface area-enlarging means being in direct thermal contact with the wall.

13. The device as claimed in claim 12, wherein means enlarging the heat conducting surface area are fins.

14. The device as claimed in claim 1, wherein the surface area-enlarging means are added to the inner surface of the wall.

15. The device as claimed in claim 1, wherein the moistening means are only active in an upstream zone of the wall such that the air cooled in this zone cools a remaining downstream zone of the wall.

16. The device as claimed in claim 1, wherein the air transport means is a fan means.

17. The device as claimed in claim 1, wherein the evaporable liquid is water.

18. The device as claimed in claim 1, wherein the means of transport is one from the group comprised of a car, a boat, and an aircraft.

19. The device as claimed in claim 1, wherein the housing is embodied as a hollow panel with a linear dimension transversely of the wall amounting to a maximum of 1/20 of a representative linear dimension.

20. The device as claimed in claim 1, wherein the housing is embodied as a hollow panel with a linear dimension transversely of the wall amounting to a maximum of between 1/30 to 1/50 of a representative linear dimension.

* * * * *